United States Patent
Nagoshi

(10) Patent No.: US 8,612,121 B2
(45) Date of Patent: Dec. 17, 2013

(54) EGR DEVICE FOR INTERNAL COMBUSTION ENGINE

(75) Inventor: Katsuyuki Nagoshi, Tokyo (JP)

(73) Assignee: Hino Motors, Ltd., Hino-shi (JP)

( * ) Notice: Subject to any disclaimer, the term of this patent is extended or adjusted under 35 U.S.C. 154(b) by 305 days.

(21) Appl. No.: 13/129,525

(22) PCT Filed: Dec. 8, 2009

(86) PCT No.: PCT/JP2009/006683
§ 371 (c)(1),
(2), (4) Date: May 16, 2011

(87) PCT Pub. No.: WO2010/067579
PCT Pub. Date: Jun. 17, 2010

(65) Prior Publication Data
US 2011/0231078 A1    Sep. 22, 2011

(30) Foreign Application Priority Data
Dec. 11, 2008  (JP) ................. 2008-315642

(51) Int. Cl.
*F02D 41/26*    (2006.01)

(52) U.S. Cl.
USPC ........................................... 701/108

(58) Field of Classification Search
USPC ........ 701/103, 108, 110; 123/568.16, 569.19, 123/568.21
See application file for complete search history.

(56) References Cited

U.S. PATENT DOCUMENTS

| | | | |
|---|---|---|---|
| 8,346,462 B2 * | 1/2013 | Nakamura et al. | 701/114 |
| 2003/0041845 A1 | 3/2003 | Akao et al. | |
| 2013/0090839 A1 * | 4/2013 | Ishigami et al. | 701/108 |

FOREIGN PATENT DOCUMENTS

| | | | |
|---|---|---|---|
| JP | 9-264200 | * 10/1997 | ........ F02D 41/18 |
| JP | 10 122058 | 5/1998 | |
| JP | 10 141150 | 5/1998 | |
| JP | 2003 155957 | 5/2003 | |
| JP | 2003 286907 | 10/2003 | |

OTHER PUBLICATIONS

International Search Report Issued Jan. 19, 2010 in PCT/JP09/006683 filed Dec. 8, 2009.

* cited by examiner

*Primary Examiner* — Hai Huynh
(74) *Attorney, Agent, or Firm* — Oblon, Spivak, McClelland, Maier & Neustadt, L.L.P.

(57) ABSTRACT

An EGR device for an internal combustion engine returns an EGR gas from an exhaust passage to an intake passage of an engine. The EGR device is configured to determine a target EGR ratio from an engine rotation number and an engine load and calculate an estimate EGR ratio from an intake air amount to the engine and a cylinder intake gas amount to detect a response delay of the EGR gas from a difference between the target and estimate EGR ratios.

3 Claims, 4 Drawing Sheets

EGR DEVICE FOR INTERNAL COMBUSTION ENGINE

TECHNICAL FIELD

The present invention relates to an EGR device for an internal combustion engine which supplies an EGR gas to effectively reduce production of $NO_x$.

BACKGROUND ART

An exhaust gas recirculation device (EGR device) has been widely used which returns a portion of exhaust gas (hereinafter referred to as "EGR gas") to an intake system to slow combustion and lower a combustion temperature in an internal combustion engine to thereby achieve reduction of $NO_x$.

FIG. 1 shows an example of a supercharged internal combustion engine 1 which has intake and exhaust passages 3 and 5 connected to intake and exhaust manifolds 2 and 4 of the engine 1, respectively. The exhaust passage 5 is provided with a turbine 7 driven by an exhaust gas 6, and the intake passage 3 is provided with a compressor 8 which produces compressed air 9 with the turbine 7. The turbine 7 and the compressor 8 make up a supercharger 10 as a turbocharger so as to supply the air 9 compressed by the compressor 8 of the supercharger 10 to the intake passage 3. In FIG. 1, reference numerals 11, 12, 13 and 14 denote an air cleaner, an intercooler, cylinders of the engine 1 and a fuel injector, respectively.

Disposed between the intake and exhaust passages 3 and 5 is an EGR means 15. The EGR means 15 of FIG. 1 interconnects the intake and exhaust manifolds 2 and 4 through an EGR piping 16 provided with an EGR cooler 17 and an EGR valve 19 opened/closed by an actuator 18.

An accelerator pedal (not shown) of a driver seat is provided with an accelerator sensor (load sensor) 20 which detects an accelerator opening degree as a load of the engine 1. The engine 1 is provided with a rotation sensor 21 which detects a rotation number thereof. Accelerator opening degree and rotation number signals 20a and 21a of the sensors 20 and 21, respectively, are input to a controller 22 which constitutes an engine control computer (ECU: Electronic Control Unit).

On the other hand, the controller 22 outputs an opening degree command signal 18a which gives a command for an opening degree to the actuator 18 of the EGR valve 19 as well as a fuel injection signal 14a which gives commands for injection timing and amount of fuel to the fuel injector 14 for injecting fuel into the cylinders 13.

During an operation of the engine 1, the controller 22 controls the EGR valve 19 on the basis of the accelerator opening degree and rotation number signals 20a and 21a to maintain the opening degree of the EGR valve 19 at a position depending on an operating state of the engine 1, thereby recirculating the EGR gas to the intake passage 3 for reduction of $NO_x$ in the exhaust gas.

The controller 22 determines a target EGR ratio on the basis of the rotation number of the engine 1 and the like and controls the EGR valve 19 and the like for conformity with the target EGR ratio. Recently proposed is a device which diagnoses a failure of EGR means due to a defect of an EGR valve (see, for example, Patent Literature 1).

CITATION LIST

Patent Literature
[Patent Literature 1] JP10-141150A

SUMMARY OF INVENTION

Technical Problems

The opening degree command signal 18a output by the controller 22 to the actuator 18 of the EGR valve 19 on the basis of the target EGR ratio may cause the EGR valve 19 to open/close slowly due to, for example, adhesion of the EGR valve 19, resulting in a response delay of the EGR gas. This is, however, misjudged normal on the basis of a fact that a target opening degree of the EGR valve 19 is attained; thus, it is problematic that the response delay of the EGR gas is unrecognizable.

The invention was made in view of the above and has its object to provide an EGR device for an internal combustion engine capable of recognizing a response delay of an EGR gas.

Solution to Problems

The invention provides an EGR device for an internal combustion engine having an EGR means to return an EGR gas from an exhaust passage to an intake passage of an engine, the EGR device being configured to determine a target EGR ratio from an engine rotation number and an engine load and calculate an estimate EGR ratio from an intake air amount to the engine and a cylinder intake gas amount to detect a response delay of the EGR gas from a difference between the target and estimate EGR ratios.

In the invention, preferably, the EGR device is configured to determine that the response delay of the EGR gas exists when the difference between the target and estimate EGR ratios is larger than a reference value and the state of the difference being larger than the reference value continues for a determination reference time or longer.

In the invention, preferably, the EGR device is configured to start a determination count when the difference between the target and estimate EGR ratios becomes larger than the reference value, to terminate the determination count when the difference between the target and estimate EGR ratios becomes smaller than the reference value and to compare a count number of the determination count with the determination reference time.

In the invention, preferably, the estimate EGR ratio is calculated by using: EGR ratio=(cylinder intake gas amount−intake air amount)×100/cylinder intake gas amount, and the cylinder intake gas amount is calculated by using: cylinder intake gas amount=volumetric efficiency×(engine rotation number/120)×exhaust amount×density.

Thus, the target EGR ratio is determined on the basis of the engine rotation number and engine load and the estimate EGR ratio is calculated on the basis of the intake air amount to the engine and the cylinder intake gas amount to detect a response delay of the EGR gas from a difference between the target and estimate EGR ratios, so that a conventionally unrecognizable response delay can be recognized.

Advantageous Effects of Invention

According to the EGR device for an internal combustion engine of the invention, the response delay of the EGR gas is detected from a difference between the target and estimate EGR ratios, so that an excellent effect may be achieved that the response delay of the EGR gas can be properly detected even if the EGR valve slowly opens/closes into a target opening degree.

DESCRIPTION OF EMBODIMENT

An embodiment of the invention will be described with reference to the drawings.

Figure 1:
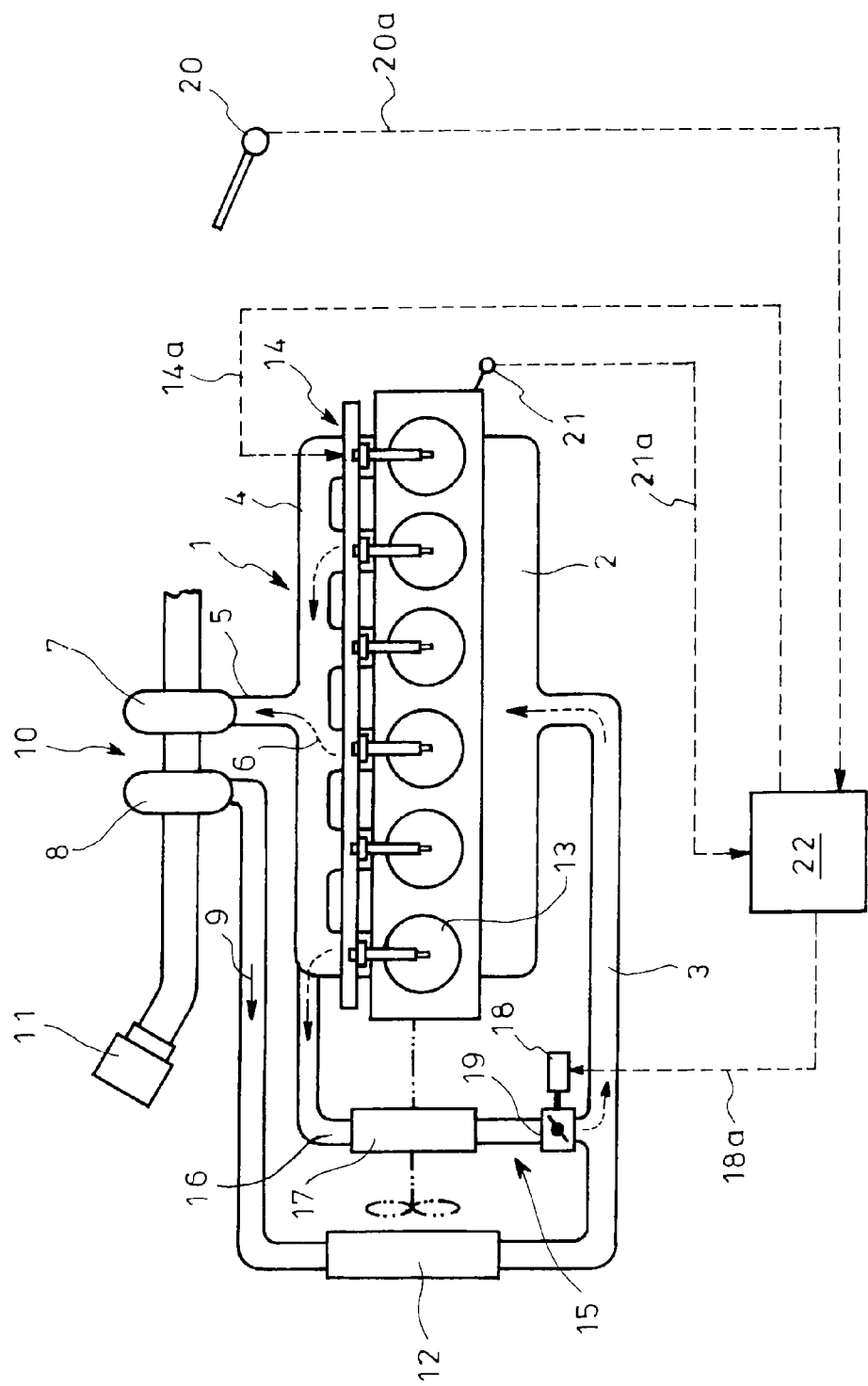
FIG. 1 is a schematic overview showing a conventional EGR device for an internal combustion engine.
Figure 2:
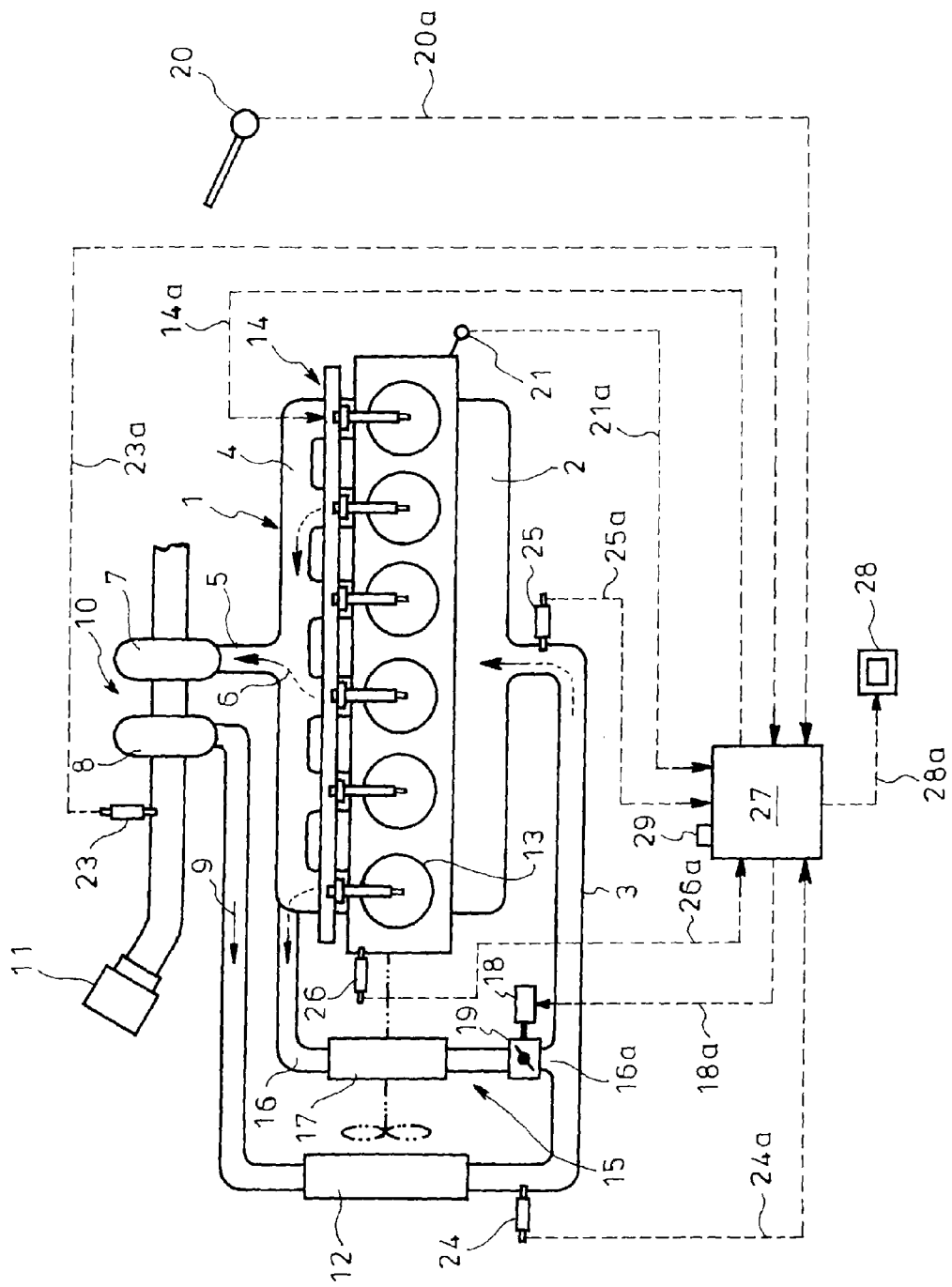
FIG. 2 is a schematic overview showing an embodiment of the invention.
Figure 3:
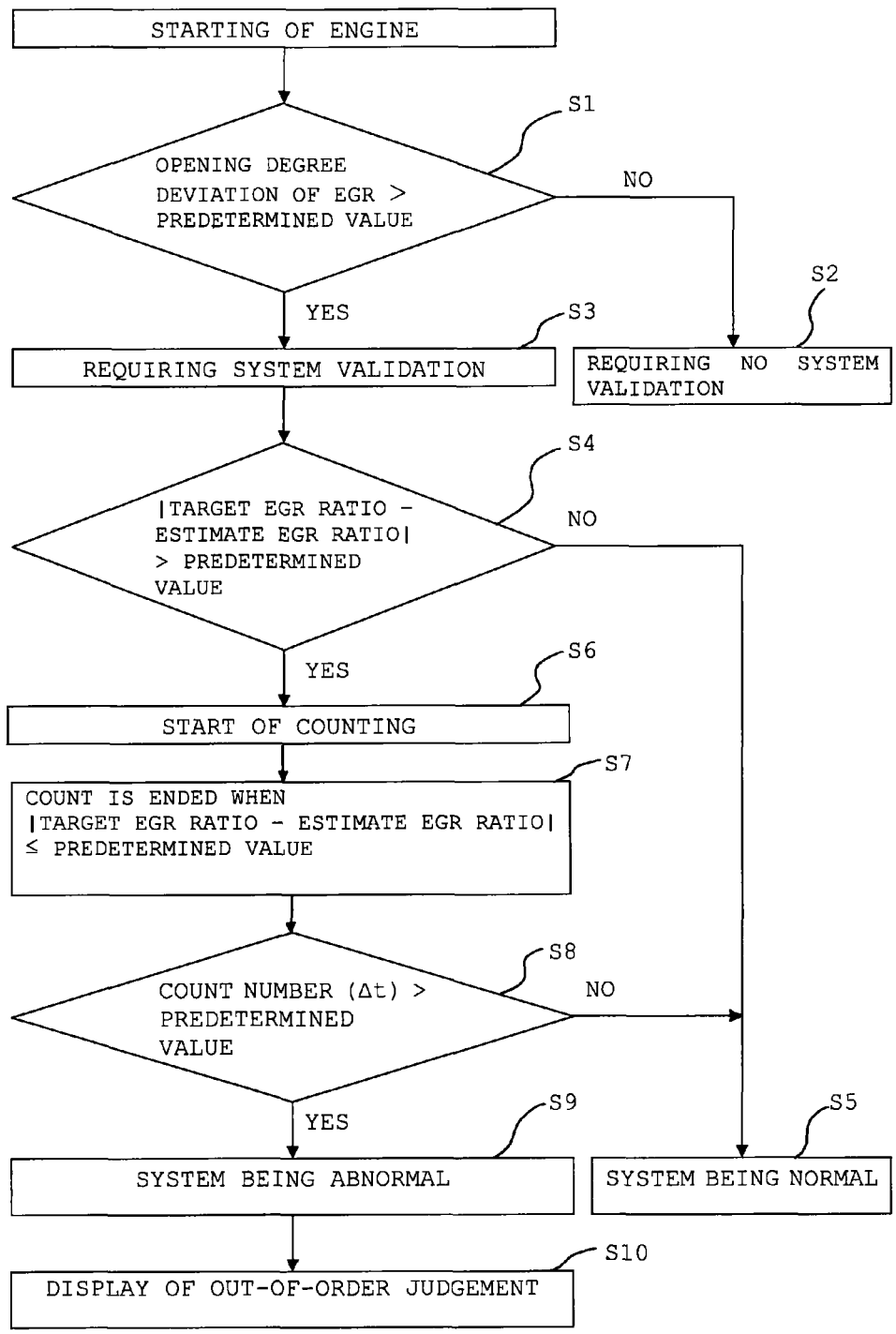
FIG. 3 is a processing flowchart for the embodiment of the invention.
Figure 4:
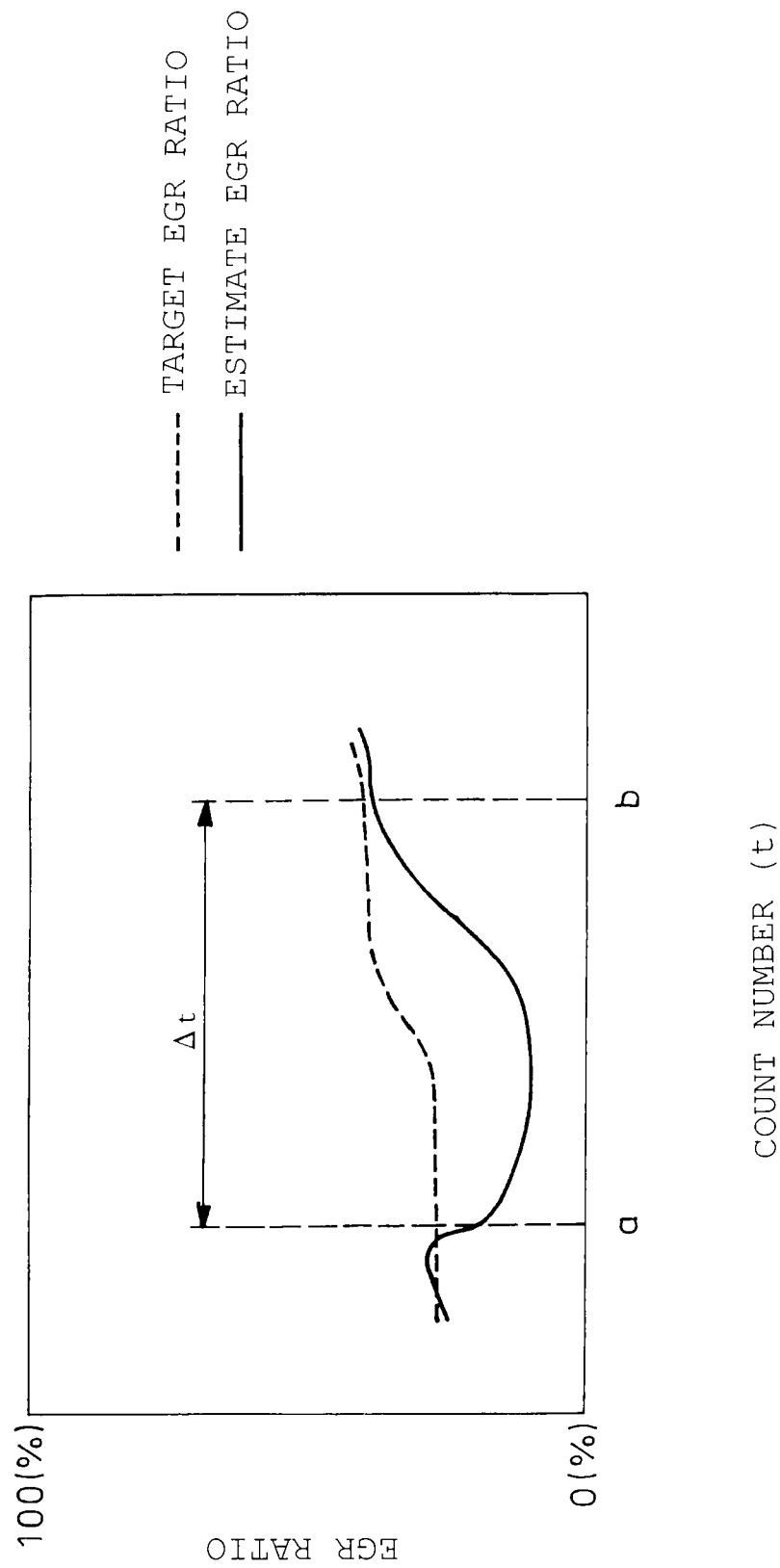
FIG. 4 is a graph conceptualizing judgment of a response delay of EGR.

FIGS. 2 to 4 show the embodiment of the invention. In the figures, parts similar to those in FIG. 1 are represented by the same reference numerals.

An EGR device for an internal combustion engine illustrated in the embodiment is provided with an EGR means 15 between intake and exhaust passages 3 and 5 of the engine 1 to return an EGR gas from the exhaust passage 5 to the intake passage 3. The EGR means 15 has an EGR piping 16 through which the intake passage 3 interconnect intake and exhaust manifolds 2 and 4; the EGR piping 16 of the EGR means 15 is provided with an EGR cooler 17 and an EGR valve 19 opened/closed by an actuator 18.

Disposed upstream of a compressor 8 is an air flow sensor (AFM: Air Flow Meter) 23 which detects an intake air amount to the engine 1. Disposed in the intake passage 3 downstream of an intercooler 12 and before an outlet 16a of the EGR piping 16 is a boost pressure sensor 24 which detects a boost pressure. Disposed in the intake passage 3 between the outlet 16a of the EGR piping 16 and the intake manifold 2 is an intake manifold temperature sensor 25 which detects a temperature of the intake manifold 2. The boost pressure and intake manifold temperature sensors 24 and 25 are located adjacent to the intercooler 12 and the intake manifold 2, respectively. The engine 1 is provided with a water temperature sensor 26 which detects a temperature of cooling water.

An accelerator pedal (not shown) of a driver seat is provided with an accelerator sensor (load sensor) 20 which detects an accelerator opening degree as a load of the engine 1. The engine 1 is provided with a rotation sensor 21 which detects a rotation number thereof.

Input to a controller 27 which constitutes an engine control computer (ECU: Electronic Control Unit) are an intake air amount signal 23a from the air flow sensor 23, a boost pressure signal 24a from the boost pressure sensor 24, an intake manifold temperature signal 25a from the intake manifold temperature sensor 25, a cooling water temperature signal 26a from the water temperature sensor 26, an accelerator opening degree signal 20a from the accelerator sensor 20 and a rotation number signal 21a from the rotation sensor 21.

Output from the controller 27 are an opening degree command signal 18a which gives a command for an opening degree to the actuator 18 of the EGR valve 19 in accordance with the input signals, a display signal 28a to displaying means 28 such as a hazard lamp and a fuel injection signal 14a which gives commands for injection timing and amount of fuel to the fuel injector 14 which injects the fuel into cylinders 13. The controller 27 is also provided with an atmospheric pressure sensor 29 which detects an atmospheric pressure and from which an atmospheric pressure signal (not shown) is input to the controller 27.

The controller 27 determines a target EGR ratio and calculates an estimate EGR ratio on the basis of the input signals, and is set to perform control as shown in the flow of FIG. 3.

An operation in the embodiment of the invention will be described.

When production of $NO_x$ is to be reduced, the controller 27 outputs the opening degree command signal 18a to the actuator 18 of the EGR valve 19 on the basis of the accelerator opening degree and rotation number signals 20a and 21a in an operating range of the engine 1 to adjust the opening degree of the EGR piping 16, so that a portion of exhaust G is caused to flow from the exhaust manifold 4 through the EGR piping 16 into the intake manifold 2, lowering a combustion temperature in the cylinders 13 to reduce the production of $NO_x$.

With starting of the engine, presence of a response delay of the EGR gas is detected by the controller 27 in accordance with the procedure of FIG. 3.

More specifically, an opening degree deviation of EGR is acquired as a precondition before the detection and whether the opening degree deviation exceeds a predetermined value or not is judged (step S1) to ascertain a changing state of the EGR valve 19. When the opening degree deviation does not exceed the predetermined value (NO at step S1), the EGR means 15 and the like are considered to have no abnormality and the procedure goes to a phase requiring no system validation and is terminated without checking the presence of the response delay of the EGR gas (step S2). On the other hand, when the opening degree deviation exceeds the predetermined value (YES at step S1), the procedure goes to a phase of system validation to check the presence of a response delay of the EGR gas (step S3).

After going to the phase of checking the presence of the response delay of the EGR gas (step S3), a difference between the target and estimate EGR ratios is acquired as an absolute value to judge whether the difference exceeds a reference value (predetermined value) (step S4).

In this connection, the target EGR ratio is determined on the basis of a mapping process or the like from the rotation number signal (engine rotation number) 21a and the accelerator opening degree signal (engine load) 20a, and is environmentally corrected by the cooling water temperature signal 26a from the water temperature sensor 26 and the atmospheric pressure signal from the atmospheric pressure sensor 29.

At the same time, the estimate EGR ratio is calculated from an intake air amount to the engine 1 and a cylinder intake gas amount by using:

EGR ratio=(cylinder intake gas amount−intake air amount)×100/cylinder intake gas amount The intake air amount is acquired from the intake air amount signal (intake air amount) 23a of the air flow sensor 23 and the cylinder intake gas amount is calculated by using:

cylinder intake gas amount=volumetric efficiency ηv× (engine rotation number/120)×exhaust amount× density ρ

The volumetric efficiency ηv is acquired by function processing of the boost pressure signal (boost pressure) 24a from the boost pressure sensor 24. The (engine rotation number/ 120)×exhaust amount is acquired, as an intake gas amount per second, from the rotation number signal (engine rotation number) 21a from the rotation sensor 21 and an amount of exhaust from the engine 1. The density ρ is acquired by function processing of the intake manifold temperature signal (intake manifold temperature) 25a of the intake manifold temperature sensor 25 and the boost pressure signal (boost pressure) 24a of the boost pressure sensor 24. The reference value for comparison with the difference is set on the basis of the opening degree of the EGR valve 19 and other process conditions.

When the comparison of the difference with the reference value reveals that the difference is smaller than the reference value (NO at step S4), the procedure goes to a phase of system being normal and is terminated since it is considered that a response delay of the EGR gas is impossible to exist (step S5). In contrast, the comparison of the difference with the reference value reveals that the difference is larger than the reference value (YES at step S4), it is considered that a response delay of the EGR gas may exist and the procedure goes to a next phase.

In the next phase, determination count is started from a start point which is a time point (a in the graph of FIG. 4) when the difference between the target and estimate EGR ratios exceeds the reference value (step S6). Subsequently, the determination count is ended at an end point which is a time point (b in the graph of FIG. 4) when the detections reveal that the difference becomes equal or less than the reference value (predetermined value)(step S7). When the difference does not become equal to or less than the reference value even after a predetermined time has elapsed, the process may be terminated with assuming that any failure or abnormality exists other than a response delay of the EGR gas.

After the determination count is ended, a count number $\Delta t$ of the determination count from the star point to the end point is acquired and is compared with a determination reference time (predetermined value) to judge whether the count number $\Delta t$ of the determination count exceeds the determination reference time (predetermined value) (step S8).

When the count number $\Delta t$ does not exceed the determination reference time (predetermined value) (NO at step S8), the procedure goes to a phase of system being normal and is terminated since it is considered that a response delay of the EGR gas does not exist (step S5). In contrast, when the count number $\Delta t$ exceeds the determination reference time (predetermined value) (YES at step S8), the procedure goes to a phase of system being abnormal and it is judged that the response delay of the EGR gas exists (step S9).

When going to the phase of system being abnormal (step S9), the controller 27 outputs the display signal 28a to the displaying means 28 such as a failure lamp to perform display such as lighting on the displaying means 28, thereby indicating the presence of abnormality.

Thus, according to the embodiment, even if a response delay of the EGR gas is caused by the EGR valve 19 slowly opening/closing into a target opening degree, the response delay of the EGR gas is detected from the difference between the target and estimate EGR ratios to properly recognize the response delay of the EGR gas.

When the embodiment is configured to judge that the response delay of the EGR gas exists when a difference between the target and estimate EGR ratios is larger than a reference value and the state of the difference being larger than the reference value continues for a determination reference time or longer, the response delay of the EGR gas is accurately discriminated through the difference and the determination reference time and, therefore, the response delay of the EGR gas can be recognized in a preferable manner.

When the embodiment is configured to start the determination count when the difference between the target and estimate EGR ratios becomes larger than the reference value, to terminate the determination count when the difference between the target and estimate EGR ratios becomes smaller than the reference value and to compare the count number $\Delta t$ of the determination count with the determination reference time, the response delay of the EGR gas is accurately discriminated through the count number $\Delta t$ of the determination count and, therefore, the response delay of the EGR gas can be recognized in a preferable manner.

In the embodiment, when the estimate EGR ratio is calculated by using: EGR ratio=(cylinder intake gas amount−intake air amount)×100/cylinder intake gas amount, and the cylinder intake gas amount is calculated by using: cylinder intake gas amount=volumetric efficiency $\eta v \times$(engine rotation number/120)×exhaust amount×density $\rho$, the response delay of the EGR gas is more accurately discriminated through other data and, therefore, the response delay of the EGR gas can be recognized in a preferable manner.

It is to be understood that an EGR device for an internal combustion engine of the invention is not limited to the above embodiment and that various changes and modifications may be made without departing from the scope of the invention.

REFERENCE SIGNS LIST 1 engine
3 intake passage
5 exhaust passage
15 EGR means
$\Delta t$ count number
$\eta v$ volumetric efficiency
$\rho$ density

The invention claimed is:

1. An EGR device for an internal combustion engine comprising:
    an EGR means including an EGR valve to return an EGR gas from an exhaust passage to an intake passage of an engine; and
    a controller which is configured to acquire an opening degree deviation of EGR to determine whether system validation is required with respect to the EGR means,
    wherein, when controller determines that the system validation is required, the controller
        determines a target EGR ratio from an engine rotation number and an engine load,
        calculates an estimate EGR ratio from an intake air amount to the engine and a cylinder intake gas amount,
        acquires a difference between the target and estimate EGR ratios,
        starts a determination count when the difference between the target and estimate EGR ratios becomes larger than a reference value,
        terminates the determination count when the difference between the target and estimate EGR ratios becomes smaller than the reference value,
        acquires a counter number from the start to the end of the determination count, and
        compares the counter number with a determination reference time,
    wherein no existence of a response delay is determined when said count number does not exceed the determination reference time, and
    wherein existence of the response delay is determined when said count number exceeds the determination reference time, thereby detecting the response delay of the EGR gas due to said EGR valve.

2. The EGR device as claimed in claim 1, wherein the estimate EGR ratio is calculated by using: EGR ratio=(cylinder intake gas amount−intake air amount)×100/cylinder intake gas amount, and the cylinder intake gas amount is calculated by using:
cylinder intake gas amount=volumetric efficiency×(engine rotation number/120)×exhaust amount×density.

3. The EGR device as claimed in claim 1, wherein the controller outputs a display signal to a display device when the existence of the response delay is determined.

* * * * *